United States Patent [19]

Ellefson

[11] Patent Number: 4,491,307

[45] Date of Patent: Jan. 1, 1985

[54] ROTATABLE WORKPIECE HOLDING APPARATUS

[76] Inventor: Dennis B. Ellefson, 1516 8th Ave. NW., East Grand Forks, Minn. 56721

[21] Appl. No.: 412,933

[22] Filed: Aug. 30, 1982

[51] Int. Cl.³ .......................... B23K 37/04; B23Q 1/04
[52] U.S. Cl. ........................................ 269/55; 269/76; 269/246; 269/287
[58] Field of Search ............... 414/427, 426, 429, 911, 414/764, 766; 254/2 R, 7 R, 94; 269/287, 57, 296, 71, 246, 76

[56] References Cited

U.S. PATENT DOCUMENTS

| | | | |
|---|---|---|---|
| 394,439 | 12/1888 | Beckert | 254/7 R |
| 918,192 | 4/1909 | Palmer | 269/57 |
| 1,013,024 | 12/1911 | Lake | 269/287 |
| 2,006,451 | 7/1935 | Glidden | 269/287 |
| 2,117,435 | 5/1938 | Langstroth | 269/287 |
| 2,380,415 | 7/1945 | Carruthers | 414/429 |
| 3,069,153 | 12/1962 | Brown | 269/287 |
| 3,266,700 | 8/1966 | Bauer et al. | |
| 3,497,082 | 2/1970 | Flitter | |
| 3,521,875 | 7/1970 | Kapelsohn | |
| 3,868,101 | 2/1975 | Nozaki et al. | |
| 3,909,335 | 9/1975 | Jellison | |
| 3,954,198 | 5/1976 | Sedelmayer | 414/429 |
| 4,039,115 | 8/1977 | Randolph et al. | 269/287 |
| 4,057,262 | 11/1977 | Boon | 414/766 |
| 4,202,539 | 5/1980 | Polastri et al. | |

Primary Examiner—Robert C. Watson
Attorney, Agent, or Firm—Merchant, Gould, Smith, Edell, Welter & Schmidt

[57] ABSTRACT

An apparatus for holding a workpiece is provided which will allow rotation of the workpiece within the apparatus. A generally stationary base (78) supports a rotatable assembly which includes a pair of outer rings (62,62'), at least one inner hoop (64,64') positioned within each ring, and means (42,112) for securing the workpiece substantially within the assembly are included in the apparatus. Bearing mechanisms (94,94') on the base (78) engage portions of a respective outer ring to allow rotative movement of the assembly about an axis (52). Preferably the base is provided with means (84) for adjusting the distance between the outer rings (62,62') along the axis (52). Means (101) for preventing the rotation of the assembly and workpiece may also be provided.

3 Claims, 7 Drawing Figures

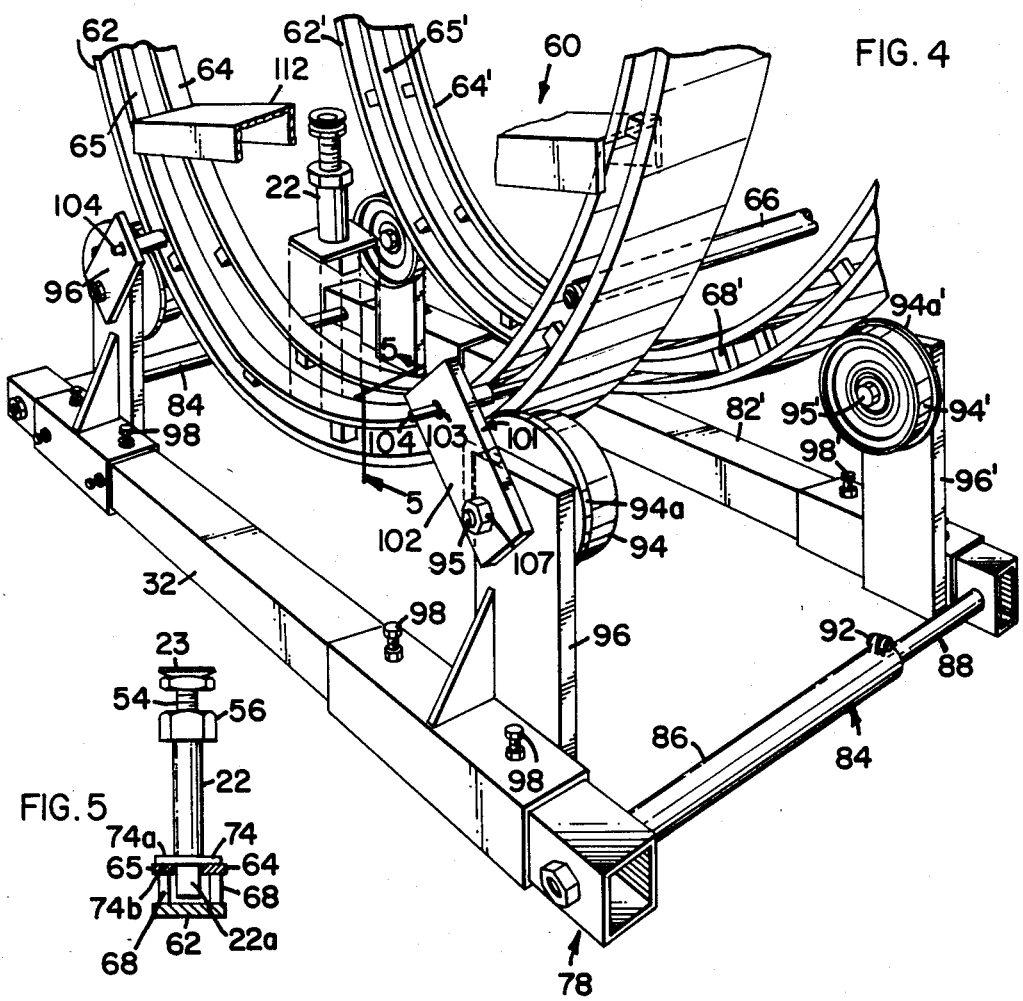
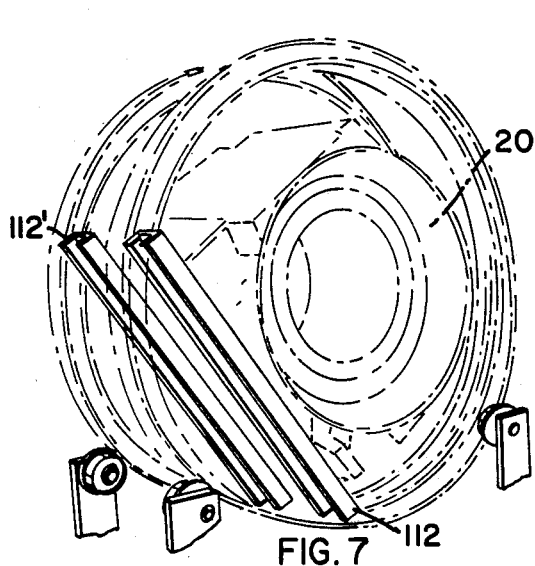
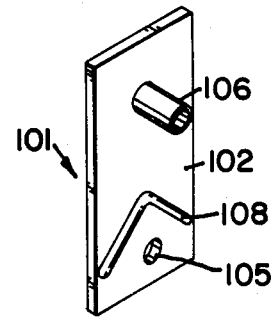
FIG. 4
FIG. 5
FIG. 6
FIG. 7

ROTATABLE WORKPIECE HOLDING APPARATUS

TECHNICAL FIELD

The present invention relates to apparatus for holding a workpiece, and in particular to an apparatus having an axis of rotation and a rotatable assembly wherein the workpiece is fixedly secured and is rotatable about the axis with a portion of the apparatus remaining stationary, serving as a support for the rotating assembly.

BACKGROUND

Workstands for items such as stators, engines, turbines, and the like are known and examples of prior art devices include those shown and described in U.S. Pat. No. 4,202,539 to Polastri et al. issued May 13, 1980 and U.S. Pat. No. 3,521,875 to Kapelsohn issued July 28, 1970. However, prior art workstands are generally quite cumbersome to use and oftentimes are not adjustable so that the size of the workpiece which may be placed in the device is limited. Another advantage which is often lacking in workpiece holding devices or workstands is the ability to rotate the workpiece to allow the operator ease of access to the various parts of the workpiece.

The present invention provides a workpiece holding apparatus which not only allows rotation of the workpiece therein, but also allows the operator to adjust the apparatus so that it may satisfactorily accommodate several sizes of workpieces. The present invention is believed to be a true advance in the state of the art as its structure and operation afford a number of advantages not available in any single prior art device. The invention is relatively uncomplicated, adjustable, and a portion of the apparatus is rotatable while the remainder of the apparatus remains stationary for stability. The means for supporting a workpiece within the rotatable portion are unique in their cooperation with the apparatus to allow the operator to position and secure the workpiece within the apparatus with a minimum of effort.

These and further advantages of the invention over the prior art will become more apparent after a reading of the description and claims which follow.

SUMMARY OF THE INVENTION

The invention is an apparatus for holding a workpiece and allowing rotation of the secured workpiece as it is being worked on. The workpiece could be any piece of equipment which requires support while being worked upon, and could well be a stator from an electric generator or motor which is being rewired. The apparatus includes a ground-engaging base, an assembly rotatably supported by the base, and means for securing the workpiece substantially within and to the assembly. The assembly has an axis of rotation and preferably includes two outer rings, each of the same diameter, spaced-apart longitudinally along the assembly axis. At least one inner hoop is secured coaxially within a respective outer ring and each hoop has a diameter less than its respective outer ring. A second inner hoop may be secured coaxially within each outer ring, in longitudinally spaced-apart relationship with the first inner hoop contained in each ring.

The apparatus further includes means on the base for engaging portions of each outer ring of the assembly for rotatable movement of the assembly about its axis. Such engaging means may be bearing mechanisms, a pair of which are spaced apart and located adjacent and substantially beneath a respective outer ring. Each bearing mechanism may include means for holding the outer ring upon it as the assembly rotates thereupon.

The means for securing the workpiece within the assembly preferably includes adjustable jack mechanisms and various support mechanisms as well. Preferably each jack mechanism includes a base portion which rests upon the inner hoop or hoops contained by the respective outer ring. The mechanism may include leg members which extend to the outer ring to provide additional stability to the arrangement. A telescoping member extendable radially towards the workpiece, for engaging a surface of the workpiece, is also provided each mechanism. At the free end of the telescoping member a pivotable portion provides adjustability for insuring a secure contact of the mechanism with the workpiece.

Preferably the apparatus is provided with means for adjusting the distance longitudinally between the outer rings of the assembly. Such means may include a spacer member located on the base near opposing pairs of bearing mechanisms. Each spacer member may have a telescoping portion contained within a larger portion which allows movement of the telescoping portion along and within the larger portion. A locking device may be provided to secure the two portions together to achieve the desired spacing between the outer rings of the apparatus.

BRIEF DESCRIPTION OF THE DRAWINGS

FIG. 4 is an enlarged perspective view of a portion of a second embodiment of the present invention with portions broken away, and a screwjack shown moved away from the inner hoops.

FIG. 5 is a cross-sectional view of a portion of the present invention as generally seen along lines 5—5 in FIG. 4.

FIG. 6 is a perspective view of a portion of the present invention shown in FIG. 4.

FIG. 7 is a schematic perspective view of the present invention illustrating another portion of the present invention.

DETAILED DESCRIPTION OF THE INVENTION

Throughout the following description reference will be made to the drawings and the same numerals will be used throughout the several views to indicate the same or like parts of the invention. To best appreciate the preferred embodiment of the invention, a relatively simple embodiment will be disclosed prior to discussion of the preferred embodiment.

Figure 1:
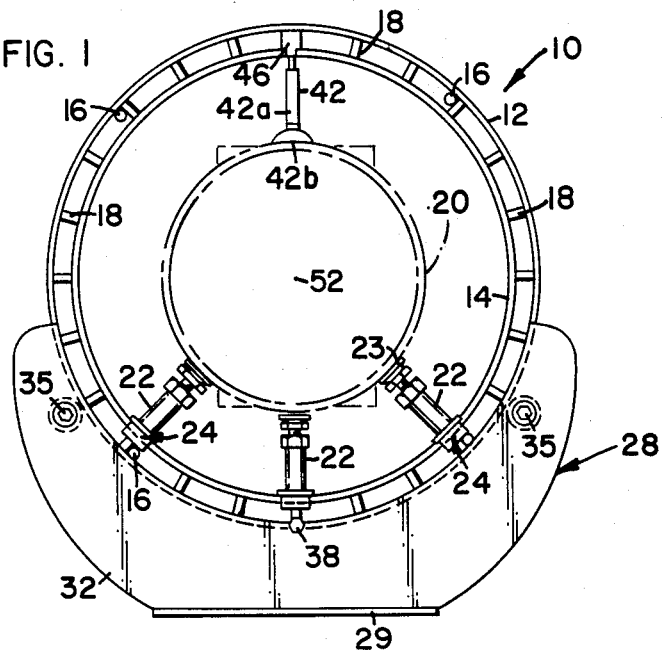
FIG. 1 is a front elevational view of one embodiment of the present invention.
Figure 3:
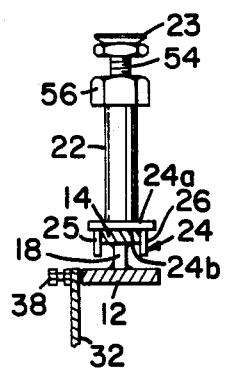
FIG. 3 is a cross-sectional view of a portion of the present invention as generally seen along lines 3—3 in FIG. 2.
Figure 2:
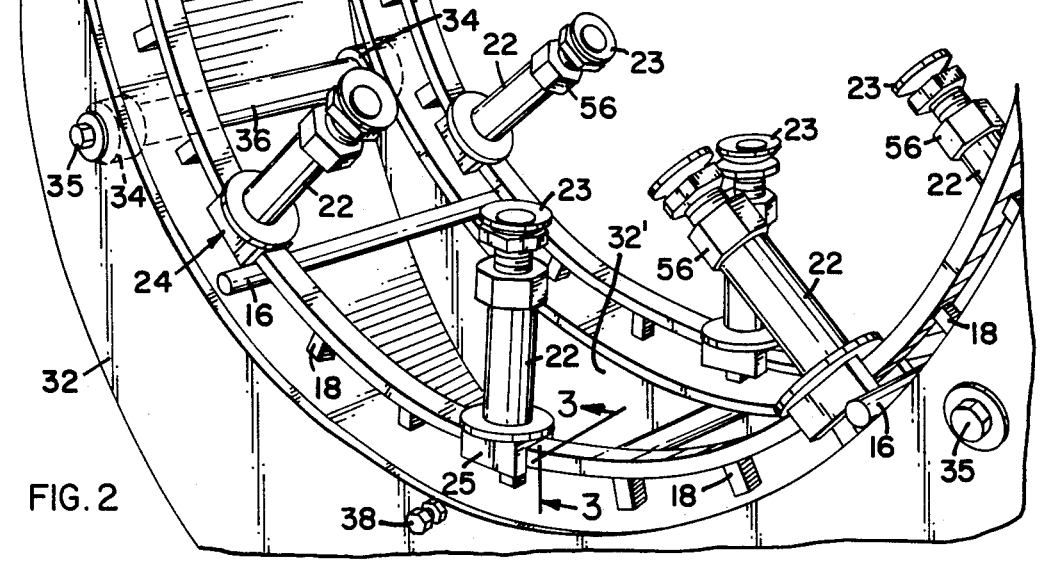
FIG. 2 is an enlarged perspective view of a portion of the embodiment shown in FIG. 1.

Referring now to FIGS. 1-3 a first embodiment of the invention is shown. Essentially the invention 10 has three structurally distinct aspects: a ground-engaging base or support stand, a rotatable ring and hoop assembly supported by the base, and means for securing a workpiece substantially within the rotatable assembly.

The assembly includes an axis of rotation 52 and a pair of spaced apart coaxial outer rings 12,12', with each ring 12,12' having an inner hoop 14,14' respectively. See FIG. 2. A plurality of jack mechanisms 22 arranged along the internal periphery of each hoop 14,14' help secure the workpiece 20 in fixed relationship with a support foot 42 or other support member which will allow the workpiece 20 to be held within the assembly. Workpiece 20 could be any piece of equipment which requires support while being worked upon, and could well be a stator from an electric generator or motor which is being rewired. The rewiring of stators requires frequent rotation of the workpiece to ensure that a convenient position for worker access is provided.

The base or support stand 28 which supports the assembly is shown having a flat bottom side 29, outwardly extending arcuate sides, and a generally concave top side. As can be seen in FIG. 2, the base has an interior portion defined by a pair of spaced apart first and second arc-shaped face plates 32,32' and a pair of concave side plates 33 (the other side face plate not being shown). Each side plate 33 extends between and connects opposite ends of the pair of face plates 32,32'. Located at opposite upper portions of the face plates is a pair of bearing mechanisms 35 for supporting and allowing rotation of the assembly upon the support stand 28. In this embodiment each bearing mechanism 35 comprises a bearing axle 36 extending across a portion of the base interior from one face plate 32 to the other face plate 32'. At each end of each axle 36 and adjacent a respective face plate 32,32' is a roller bearing 34 which is of standard construction for engaging a portion of the rotatable assembly, preferably the outer periphery of a respective outer ring 12,12'.

The rotatable assembly can be best appreciated from a study of FIG. 2. In this embodiment, a pair of outer rings 12,12' are spaced-apart longitudinally along the axis of rotation 52. The rings 12,12' are held in this spaced apart relationship by a plurality of ring-connecting members 16 positioned at substantially equal distances along the internal diameter of the rings 12,12'. Each ring-connecting member 16 may be a rod of steel which is fixed at each free end to a portion of a respective outer ring in a manner which will prohibit independent movement by either ring. The rings 12,12' have the same outside and inside diameters. The outside periphery or surface of each ring is manufactured to be smooth in order to move freely along the roller bearings 34. The means for mounting an inner hoop coaxially within a respective outer ring are located along the inside periphery or surface of each ring. In this embodiment a number of radially extending support struts 18 are welded or otherwise suitably fixed at spaced-apart locations along each outer ring inside surface 12a,12a'. Each strut 18 has a free end which is fixedly secured to a portion of the outside periphery of a respective inner hoop 14,14'.

The outer rings 12,12' of this embodiment are each provided with a single inner hoop 14,14' secured thereto by the supporting struts 18. Each hoop 14,14' has an inside diameter and an outside diameter. The hoop outside diameter is less than the inside diameter of its respective outer ring 12,12'. The inside periphery or surface of each hoop is preferably substantially smooth in order to suitably engage the jack mechanisms of the invention.

The ring and hoop pairs 12,14 and 12',14', being fixedly spaced apart longitudinally along the axis of rotation, roll together freely upon the pairs of bearing mechanisms 35 provided in the base 28. In this manner the entire assembly rotates as a unit. The assembly may be locked in a particular position upon the base by any suitable means including a locking bolt 38 located in a face plate 32 of the base. An individual locking bolt 38 may be provided in each face plate 32,32' for braking each ring in the assembly and halting the rotation of the workpiece and the assembly.

To support the workpiece 20 within the assembly, jack mechanisms are used which may be adjusted radially to contact a surface portion of the workpiece and together force the workpiece into fixed engagement with a support foot 42 or like member, such as a beam 112 shown in FIG. 7.

The particular jack mechanism used in the invention when a single hoop is used with each outer ring is a type shown in FIGS. 2 and 3. Each jack mechanism comprises a standard screw jack 22 having a base plate 24, worm gear 54 and pivotable head portion 23 which is adapted to engage a workpiece surface. Referring specifically to FIG. 3, the base plate 24 of the jack mechanism has a top side 24a and the bottom side 24b. The bottom side 24b rests upon the inside peripheral surface of the inner hoops 14,14' and is supported thereby. Extending from the base bottom side 24b are first and second leg members 25,26. The pair of leg members 25,26 are spaced apart a sufficient distance to allow a portion of an inner hoop 14,14' to be held therebetween. The leg members 25,26 also provide lateral support for the jack mechanism as it rests upon an inner hoop. A standard screw jack extends from the top side of the base plates. The jack can be a hollow, tubular member 22 fixedly secured at one end to the base plate 24 and having at its free other end a threaded stationary nut 56. A worm gear 54 is threadably secured within the tubular member 22 and is extendable radially or retractable radially with respect to the tubular member 22. At a free end of the worm gear 54 is fixed a pivotable head portion 23, generally having a diameter greater than that of the worm gear 54. The pivotable head 23 is substantially flat and designed to contact a sufficient portion of a workpiece surface for support by the jack mechanism.

Generally several of the above-described jack mechanisms are positioned along a lower portion of the assembly and opposite this arrangement a support mechanism of a different type is provided. As can be seen in FIG. 1, at a location on the assembly opposite the several jack mechanisms, a support foot 42 may be provided on each outer ring 12,12' or at least on one of the outer rings. A support foot 42 of the type shown in this embodiment is well known in the art. A threaded rod for securing the foot to the inner hoop is provided and extends radially from a point on the inside surface of the inner hoop 14. The support foot 42 is removable from and placed on the rod by simply threading one end of the foot on to the threaded rod. A central tubular member 42a comprises the body of the support foot. One free end of the tubular member is threaded for engaging the support rod and a second free end has a substantially flat, preferably circular head 42b with a diameter greater than that of the tubular member. The support feet allow opposite pressure to be applied against the workpiece as opposed to that provided by the jack mechanisms. It should be appreciated that more than one support foot for each inner hoop may be used.

The assembly is initially locked in position upon the base to facilitate the placement of a workpiece within the assembly. The necessary number of jack mechanisms are placed along the inside surface of each of the inner hoops 14, 14' as shown in FIG. 2. The support feet 42 are threaded on to the respective support rods. Depending on the size of the workpiece 20 to be held within the assembly, the jack mechanisms are adjusted radially to allow sufficient space for the workpiece 20 to be situated between the jack mechanism arrangement and the support feet. With the workpiece resting upon the jack mechanisms the operator adjusts the mechanisms by advancing each worm gear 54 radially so as to force the workpiece into direct contact with each of the support feet 42. Each of the jack mechanisms is adjusted until the workpiece is held securely within the assembly independent of any other support except that provided by the jack mechanisms and the support feet.

When the workpiece is securely held within the assembly, the assembly may be unlocked from its fixed position and the assembly and workpiece rotated to provide ready access by the operator to every portion of the workpiece.

To remove the workpiece from the apparatus, the assembly is again preferably locked in position upon the base. Each jack mechanism is retracted inwardly with respect to its tubular member, thus providing a free space between the workpiece and the support feet as a result of the retraction of the worm gears. When sufficient space is provided, the workpiece may be lifted from the jack mechanisms and removed from the apparatus.

Of course it should be appreciated that variations of this embodiment are certainly possible in light of the teachings above. These variations will be made more evident by the disclosure of the preferred embodiment which follows.

Portions of the preferred embodiment are shown in FIGS. 4-7. The outer rings and inner hoops of this embodiment are not shown in their entirety in FIG. 4 as the complete ring and hoop arrangement can be understood from FIGS. 1 and 7.

The primary difference between the preferred embodiment and the embodiment shown in FIGS. 1-3 is the provision in the preferred embodiment of means for adjusting the distance between the outer rings longitudinally along the assembly axis. This provides flexibility in the size and length of a workpiece which can be accommodated by the apparatus. Additionally, means can be provided for adjusting the height of the assembly with respect to the apparatus base. These aspects of the invention will be disclosed in detail hereinafter.

Referring now to FIG. 4, outer rings 62,62' are substantially identical to the outer rings 12,12' described in the first embodiment. However, instead of a single hoop fixed internally and coaxially to each ring, a pair of inner hoops 64,65 and 64',65' is secured in spaced apart relationship on the inside surface 62a, 62a' of each outer ring. Support struts 68,68' are used to connect each hoop with a portion of the inside surface of the respective outer ring.

With the arrangement of two inner hoops within each outer ring, a second type of jack mechanism is provided. See FIG. 5. The jack mechanism includes a base plate 74 having a top surface 74a and a bottom surface 74b, and a hollow, tubular member 22 extending from the top surface 74a of the base plate with a free end of the tubular member having a threaded stationary nut 56 fixed thereto. A worm gear 54 is threadably positioned within the tubular member 22 for extension radially outwardly and inwardly with respect to the tubular member. A pivotable head 23 engages the free end of the worm gear 54 and provides a surface for direct contact with a portion of the workpiece.

The base plate 74 is provided with a centrally located opening (not shown) through which the worm gear 54 may be fully retracted. The tubular member 22 may extend a relatively short distance from the base plate bottom side 74b.

The jack mechanism is used by placing the base plate 74 over a portion of both inner hoops on each outer ring. The mechanism is positioned so that the opening is aligned with the space between the inner hoops, this alignment will allow the worm gear 54 to be retracted fully against the inside surface of the respective outer ring. Also this would allow the lower part 22a of the tubular member 22 to be positioned between the respective inner hoops to afford lateral support for the jack mechanism.

The bearing mechanisms of the preferred embodiment are like those in the first embodiment in that a pair of mechanisms supports each outer ring and allows rotative movement of the respective ring upon it. The bearing mechanisms are generally positioned in spaced apart relationship beneath lowermost portions of each outer ring. See FIG. 4. In the preferred embodiment each mechanism may include a bearing upright 96,96' secured to and extending upwardly from the base 78 of the apparatus. Positioned on one side of the upright so as to be directly below and aligned with a portion of the outside surface of the respective outer ring 62,62' is a commercially available bearing 94,94'. Each bearing is supported with respect to the upright 96 by a bearing axle 95,95'. A peripheral flange 94a, 94a' extending along a side of each bearing near the respective upright 96,96' prevents the outer ring 62,62' from moving outwardly and off the base 78 as the assembly rotates on the bearing mechanisms.

To brake the rotating assembly and fix it in position upon the base an individual braking mechanism 101 is provided which cooperates with each respective bearing upright to stop the rotative movement of the assembly. See FIGS. 4 and 6. The braking mechanism includes a generally flat rectangular member 102. A V-shaped stabilizer 108 is welded or otherwise fixed to one side of the member 102 at a generally central location. The stabilizer 108 is designed and constructed so that it will mate with an edge portion of the respective bearing upright, e.g. in FIG. 4. the upright 96 nearest the outer ring 62. An opening 103 extending through the member near one end thereof has a brake rod sleeve 106 extending in alignment therewith from the same side of the member 102 as the V-shaped stabilizer 108. Near the other end of the member is a second opening 105 through which the bearing axle 95 of the respective bearing mechanism may extend and the stabilizer 108 locked thereupon by any suitable type of nut 107. See FIG. 4. Each bearing mechanism upright is provided with a braking mechanism of this type so that when it is desired to have the assembly fixed on the base without rotation, both sides and ends of the assembly may be firmly braked. A brake rod 104 is provided each braking mechanism which is inserted through a respective first opening 103 and brake rod sleeve 106 and between a respective pair of inner hoops and outer ring, as well as between a number of the struts 68,68' connecting the hoops with the outer rings. See FIG. 4. When it is desired to have the assembly rotate freely again, the brake rod 104 is removed from each mechanism. The V-shape stabilizer 108 will provide sufficient support to maintain the member 102 upon the bearing upright 96.

The base 78 for the preferred embodiment is a structural framework having a plurality of members which will allow the distance between the outer rings 62,62' of the assembly to be varied longitudinally along the assembly axis as well as allow the distance between pairs of bearing mechanisms to be varied so as to raise and lower the assembly with respect to the base. In FIG. 4, it can be seen that the base 78 comprises first and second support arms 82,82' connected together at their free ends by spacer members 84. A support arm 82,82' is positioned below each outer ring 62,62' so that a pair of bearing mechanisms, secured apart from each other on each support arm 82,82', may underlie the respective outer rings 62,62'. Each bearing mechanism may be removably secured to the support arm 82, 82' by suitable nut and bolt assemblies 98. The support arms are designed and constructed to allow the nut and bolt assembly to be fixed at different points along it. Thus, the closer the bearing mechanisms are positioned to each other on a respective support arm 82,82', the higher the rotative assembly will be positioned with respect to the base.

To adjust the distance between the two outer rings 62,62', spacer members 84 are employed at each end of the frame 78 and fixedly connect the two support arms 82,82' together. Each spacer member 84 has two portions, an outer sleeve 86 and an inner sleeve 88 which is slidably contained within the outer sleeve 86. One end of the outer sleeve 86 is bolted or otherwise suitably secured to an end of one of the support arms. One end of the inner sleeve 88 is bolted or otherwise secured to the end of the other support arm. The sleeve portions 86,88 of each member 84 are fixed relative to each other by a tightening bolt 92 at the end of the outer sleeve 86 through which the inner sleeve 88 passes as it slides with respect to the outer sleeve 86. The tightening bolt 92 is constructed and designed to prevent the inner sleeve 88 from sliding with respect to the outer sleeve 86 and thus allows securement of the pair of outer rings 62,62' a fixed distance apart for rotation upon the bearing mechanisms. A similar arrangement is provided between the pair of rings 62,62' whereby a number of telescoping ring connectors 66 are positioned in substantially evenly spaced apart relation along the circumference of the rings 62,62'. Telescoping ring connectors 66 function as described above with respect to the spacer members 84 except the free ends of the sliding members are welded to inner surfaces 62a,62a' of the rings 62,62'.

To use the preferred embodiment of the invention a number of jack mechanisms are positioned along the pairs of inner hoops on each outer ring. A support beam 112,112' of the type shown in FIG. 7 may be inserted across each of the outer rings opposite the jack mechanisms. The worm gears 54 are retracted inwardly a sufficient amount to provide sufficient space between the jack mechanisms and the support beam 112 to allow the workpiece 20 to be inserted therebetween and placed upon the jack mechanisms. When the workpiece 20 is thus positioned the worm gears 54 of each jack mechanism are extended radially towards the axis of rotation of the assembly until the workpiece is forced against the support beams 112,112' or alternatively, support feet (as shown in FIG. 1), to a sufficient degree to secure the workpiece in the assembly as it rotates.

This operation is reversed to remove the workpiece from the assembly. Support beams 112,112' can be readily available channel iron or the like of suitable length and size.

Of course in light of the above teachings it will be appreciated that several variations of the disclosed embodiments are possible. For example, pairs of inner hoops could be used with each outer ring in the first embodiment, and the first embodiment could be provided with an adjustable base. Certainly variations in the jack mechanisms, the bearing mechanisms, and the spacer members could be made within the spirit of the invention. Thus the invention is not to be construed as being limited to the specific embodiments shown in the drawings.

What is claimed is:

1. An apparatus for holding a workpiece comprising: a ground-engaging base;

an assembly rotatably supported by said base, said assembly having an axis of rotation and including first and second outer rings each of the same diameter, said rings being spaced apart longitudinally along said axis, first and second inner hoops each secured coaxially within a respective outer ring and each having a diameter less than said respective outer ring diameter;

means for securing a workpiece substantially within said assembly; and wherein said securing means includes at least one adjustable jack mechanism, said jack mechanism having a base with a top side and a bottom side, a pair of spaced apart leg members extending from said base bottom side, and a telescoping member extending from said top side, said telescoping member being radially adjustable with respect to said assembly and having a free end adapted for contact with the workpiece, said leg members being designed and constructed to engage a portion of one of said inner hoops therebetween.

2. An apparatus for holding a workpiece comprising; a ground-engaging base;

an assembly rotatably supported by said base, said assembly having an axis of rotation and including first and second outer rings each of the same diameter, said rings being spaced apart longitudinally along said axis, first and second inner hoops each secured coaxially within a respective outer ring and each having a diameter less than said respective outer ring diameter;

means for securing a workpiece substantially within said assembly;

wherein said assembly includes third and fourth inner hoops, said third hoop being positioned within one of said outer rings and spaced apart from said first inner hoop longitudinally along said axis, said fourth inner hoop being positioned within said other outer ring and spaced apart from said second inner hoop longitudinally along said axis; and wherein said securing means includes at least one adjustable jack mechanism, said jack mechanism having a base with a top side and a bottom side, a pair of spaced apart leg members extending from said base bottom side, and a telescoping member extending from said top side, said telescoping member being radially adjustable with respect to said assembly and having a free end adapted for contact with the workpiece, said leg members being designed and constructed to engage a portion of one of said inner hoops therebetween.

3. An apparatus for holding a workpiece comprising:
a ground-engaging base;
an assembly rotatably supported by said base, said assembly having an axis of rotation and including first and second outer rings each of the same diameter, said rings being spaced apart longitudinally along said axis, first and second inner hoops each secured coaxially within a respective outer ring and each having a diameter less than said respective outer ring diameter;
means for securing a workpiece substantially within said assembly;
wherein said assembly includes third and fourth inner hoops, said third hoop being positioned within one of said outer rings and spaced apart from said first inner hoop longitudinally along said axis, said fourth inner hoop being positioned within said other outer ring and spaced apart from said second inner hoop longitudinally along said axis; and
wherein said securing means includes a plurality of adjustable jack mechanisms, each of said jack mechanisms having a base defining an opening therein, said base being adapted to rest upon a portion of said inner hoops within one of said outer rings, with said opening positioned between said respective hoops, each of said jack mechanisms further including a first member extending through said opening and having a first free end adapted for contact with said outer ring between said inner hoops, and a second member extending from said first member and adjustable radially with respect to said assembly, said second member having a free end adapted for contact with the workpiece.

* * * * *